United States Patent

Dietrich

[11] 4,079,486
[45] Mar. 21, 1978

[54] MEANS FOR ANCHORING A RING TENSIONING MEMBER IN A CIRCULAR CONTAINER, ESPECIALLY A CONCRETE TANK OR A CONCRETE TUBE

[75] Inventor: Hans Dietrich, Bolligen, Switzerland

[73] Assignee: Losinger AG, Berne, Switzerland

[21] Appl. No.: 715,518

[22] Filed: Aug. 18, 1976

Related U.S. Application Data

[60] Continuation of Ser. No. 542,571, Jan. 20, 1975, abandoned, which is a division of Ser. No. 417,727, Nov. 21, 1973, Pat. No. 3,950,840.

[51] Int. Cl.² .............................................. F16G 11/04
[52] U.S. Cl. ................................ 24/122.6; 24/136 R; 52/223 R; 403/210; 403/369
[58] Field of Search .................... 24/122.6, 136 R; 52/223 R, 223 L, 230; 403/210, 369, 374

[56] References Cited

U.S. PATENT DOCUMENTS

| | | | |
|---|---|---|---|
| 1,708,979 | 4/1929 | Usher | 403/369 |
| 3,048,909 | 8/1962 | Sheehan | 403/210 |
| 3,204,726 | 9/1965 | Kerman | 24/136 R X |
| 3,778,869 | 12/1973 | Andrews | 24/122.6 X |

FOREIGN PATENT DOCUMENTS

| | | | |
|---|---|---|---|
| 612,680 | 11/1960 | Italy | 52/230 |
| 365,772 | 1/1963 | Switzerland | 403/369 |

*Primary Examiner*—Paul R. Gilliam
*Assistant Examiner*—David H. Corbin
*Attorney, Agent, or Firm*—Oblon, Fisher, Spivak, McClelland & Maier

[57] ABSTRACT

An apparatus for anchoring a ring tensioning member in a circular container, especially a concrete tank or a concrete tube, characterized by a hemispherical anchorage body being located in a recess in the wall thickness of the container in overhung position having on its circumference at least one slot and through bores for a bracing cable. The bracing cable which has been inserted in the wall of said container and prestressed by a stretching mechanism will be anchored in said anchorage body, whereafter the recess will be covered in such a way as to be in alignment with the surface of said container.

4 Claims, 6 Drawing Figures

MEANS FOR ANCHORING A RING TENSIONING MEMBER IN A CIRCULAR CONTAINER, ESPECIALLY A CONCRETE TANK OR A CONCRETE TUBE

This is a continuation, of application Ser. No. 542,571, filed Jan. 20, 1975, now abandoned, which is a divisional of application Ser. No. 417,727, filed Nov. 21, 1973, now U.S. Pat. No. 3,950,840.

BACKGROUND OF THE INVENTION

The invention relates to the anchoring of a ring tensioning member in a circular container, especially a concrete tank or a concrete tube, and to an apparatus for accomplishing the same.

Circular containers as, e.g., concrete tanks, concrete pipes, etc. have been successfully prestressed since some time. Thereby there is primarily the task to insert the ring cables in the wall which cables are prestressed in order to produce a tangential pressure in the wall of the container. Due to this arrangement the wall remains without cracks, when the inside pressure, e.g. the fluid pressure or the pressure of a loose material is acting on the same. The additional longitudinally extending cables which are often inserted in the wall in order to produce a prestress force in the direction of the main axis of the container have no importance whatsoever as far as the present invention is concerned and therefore they will not be contemplated in the following description.

The tangential prestress force which is also called the ring prestress force is divided, because of the friction losses, into individual sections of the container circumference so that the individual cables usually span over 90°, 120°, 180° and only exceptionally over 360° of the circumference of the container.

The known prestressed free standing concrete tanks have one or more anchorage elevations on their external surface; in these elevations the individual cables are anchored.

The known prestressed pressure tunnels which are built in rocks have the same anchorage elevations on the internal wall surface of the tunnel; the individual cables are equally anchored in these anchorage elevations. When in case of a concrete tank e.g. three cables are inserted in the circumference wall of the container, three anchorage elevations have to be made for such a cable on the external surface of the container, whereby every end of the same cable is anchored in the neighboring two anchorage elevations. In case of a pressure tunnel the anchorage of the individual cables is to be carried out in the same way as with the concrete tanks, however with the difference that the anchorage elevations are to be made on the internal wall surface of the tunnel. Owing to the anchorage elevations jutting out inwards the hydraulic flow conditions are deteriorated.

The fact that the cable ends have to be brought out of the wall in order to anchor and prestress the cables brings problems concerning stations of construction and esthetical appearance, and besides considerable economical disadvantages. The object of the invention is to do away with the above mentioned disadvantages and to propose first of all an apparatus for anchoring a ring tensioning member in a circular container which would be simple. The jutting-out anchorage elevations should be generally eliminated in order to achieve a constant wall thickness of the container over its whole circumference and to substantially reduce the number of the ring tensioning member anchorages.

SUMMARY OF THE INVENTION

In the present invention a ring tensioning member is anchored in a circular container, especially a concrete tank or a concrete tube by cutting out a least one recess in the area of the wall thickness of said container for locating therein the inventive means in overhung position, in which means a ring tensioning member inserted in the wall and movable in the longitudinal direction thereof and prestressed by a stretching mechanism will be anchored, whereafter the recess with the inserted means will be covered in such a way that the surface of the covered recess will be in alignment with the surface of said container.

The inventive means to carry out the above mentioned method is characterized by a hemispherical anchorage body, the round part of which has at least one slot on its circumference for receiving the ring tensioning member, said body having through bores extending perpendicularly to its flat front surface, said bores serving for accommodating both ends of the same ring tensioning member.

DETAILED DESCRIPTION OF THE DRAWINGS

Figure 1:
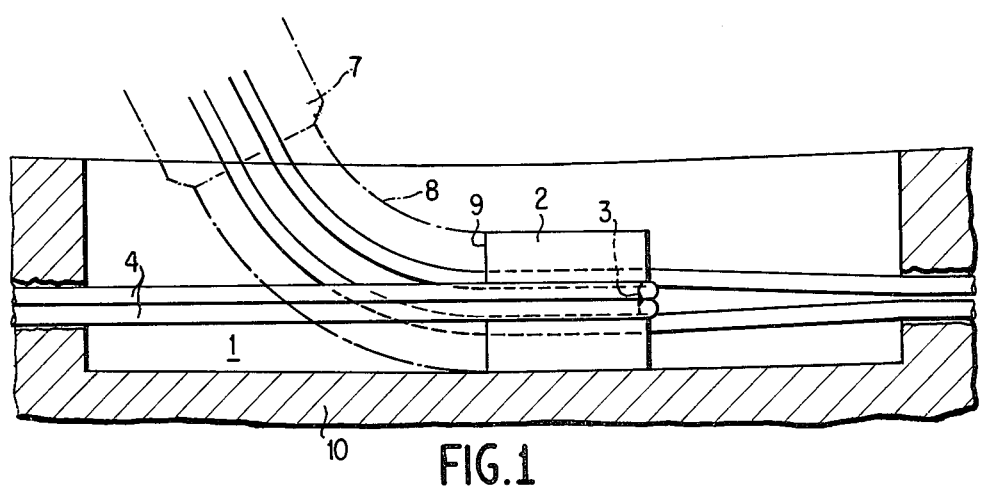
FIG. 1 shows a sectional view of a apparatus for anchoring a ring tensioning member, with a tensioning mechanism and a support.
Figure 2:
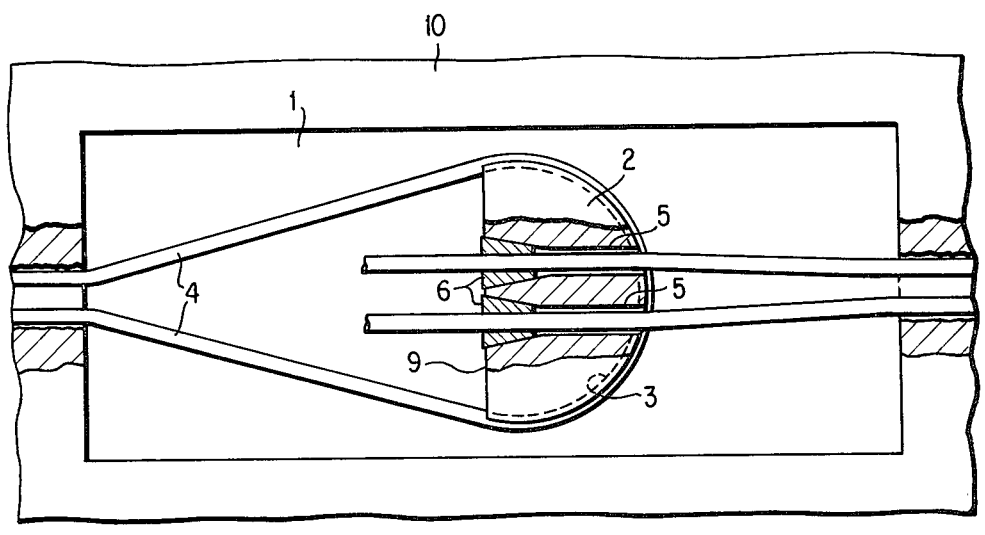
FIG. 2 shows a top view partially in section of the means according to FIG. 1.
Figure 3:
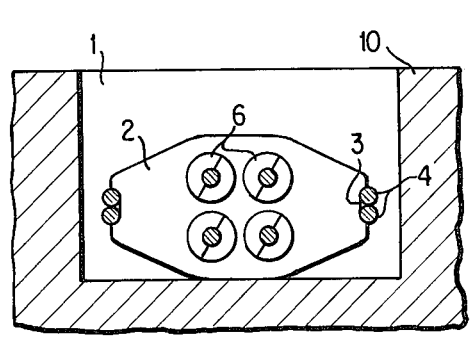
FIG. 3 shows a sectional front view of the apparatus according to FIG. 1.

FIGS. 1-3 show a recess 1 made in the wall thickness of a container 10. In the recess 1 there is located a hemispheric anchorage body 2 in overhung position, that means that the anchorage body 2 is located in the recess 1 without being supported. The round part of the body 2 has a slot 3 on its circumference in which a loop of a bracing cable 4 is inserted, so that the round part of the body 2 is encircled by this loop. The cable 4 in one piece is running with its two taut ends from the body 2 around the whole wall circumference whereby it is movable in the longitudinal direction thereof; both the straight ends of the same cable 4 are in the bores 5 of the body 2. The bores 5 extend parallel to each other and are perpendicular to the flat front surface 9 of the body 2. On the exit side of the anchorage body 2 the cable ends are caught by conical clamps 6 and anchored in the body 2.

The free ends of the cable 4 which are jutting out of the body 2 will be caught by a center hole press 7. The press 7 abuts against a support 8 having the form of an arc which is lying in the flat part of the body 2 forming its front surface 9. The purpose of this support 8 is to deviate the bracing cable 4 including the press 7 from the space of the recess 1 into a free space during the prestressing process.

Figure 4:
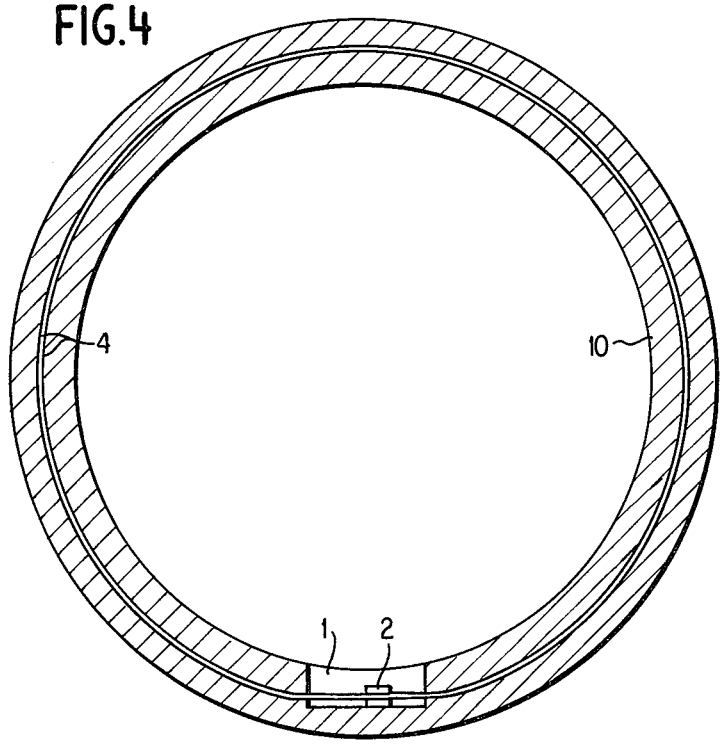
FIG. 4 shows a sectional view of a container wall with a recess on the internal surface of the wall and a ring tensioning member consisting of one piece.

FIG. 4 shows a single recess 1 on the internal surface of the wall of the container 10. As the bracing cable 4 consists of one piece only, equally only one anchorage body 2 is required.

Figure 5:
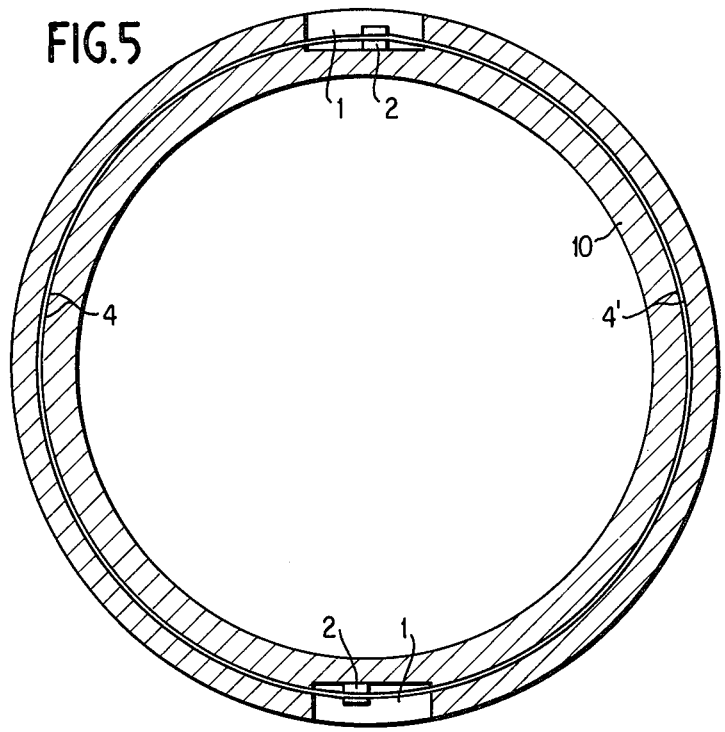
FIG. 5 shows a sectional view of a wall with two recesses on the external surface of the wall with a ring tensioning member consisting of two pieces.

FIG. 5 shows a sectional view of the wall of the container 10, where two recesses 1 have been made on the external surface of the wall, each recess serving for positioning therein one anchorage body 2, because there are inserted in the wall two bracing cables 4 and 4' each spanning over 180° of the wall circumference.

Figure 6:
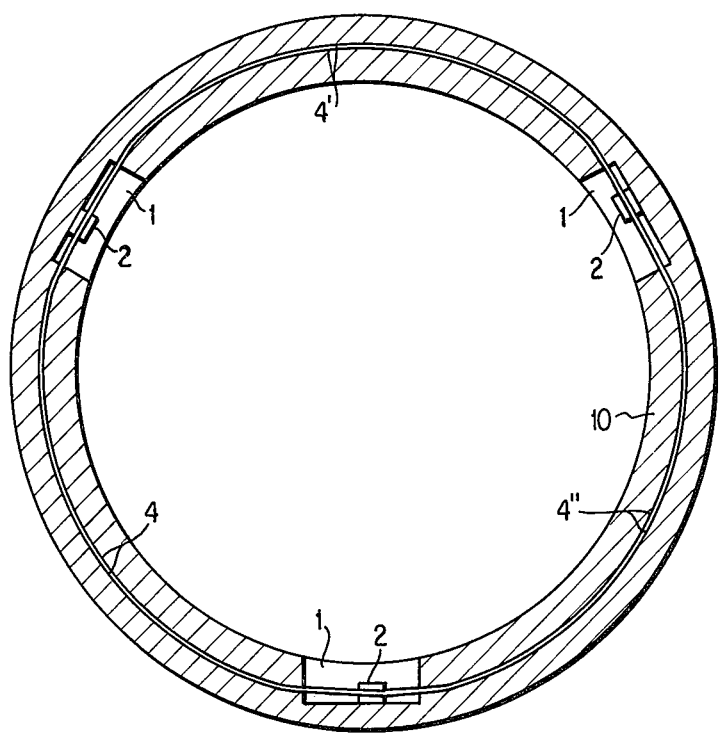
FIG. 6 shows a sectional view of a wall with three recesses on the internal surface of the wall with a ring tensioning member consisting of three pieces.

FIG. 6 shows three recesses 1 made on the internal surface of the wall of the container 10. In three anchorage bodies 2 which are positioned in these recesses bracing cables 4, 4', 4" are anchored whereby each bracing cable 4, 4', 4" spans over 120° of the wall circumference.

The prestressing of the cable 4 is carried out as follows: After the support 8 has been put on the front surface 9 of the body 2 and the tensioning press 7 has been positioned on the support 8, a not shown auxiliary anchoring means will be fixed to the ends of the cable 4. By driving out the tensioning press 7 by which both the cable ends are caught, the cable 4 is drawn through the bores 5 of the body 2; after the cable 4 has been fully prestressed, it will be locked by the external surfaces of the clamps 6 in the respective notches of the bores 5. The cable ends including the press 7 will be simultaneously deviated by the guide ways of the support 8 into the free space outside the recess space.

Because of the overhung position of the body 2 in the recess 1, the part of the cable encircling the body 2, the cable ends which have been put through the bores 5 of the body 2 as well as the following part of the cable 4 will be prestressed in the same height and in the same extent. Due to the extension of the cable the body 2 will be pushed to the right (seen in the Figure).

After the prestressing process has been completed the press 7 and the support 8 will be removed, the strands of the cable 4 will be cut off in the proximity of the front surface 9 and the whole recess along with the body and the cable ends will be filled with concrete in such a way that the external surface of the recess 1 filled with concrete will be in alignment with the wall surface of the container 10.

It is advantageous to provide the round part of the anchorage body 2 with a plurality of slots, and to provide the body 2 equally with a plurality of bores 5 enabling the use of more bracing cables at the same time.

The above described method and the respective apparatus of the present invention means for carrying out this method can be used with those structures which have been up to now provided with anchorage elevations, or because of the high price have been singly reinforced. For this purpose a bracing cable of the mark "WSL Type T" available on the market is specially apt, because it can be well prestressed. This type of bracing cable can be used for prestressing even tanks and pressure pipes made of steel with which a ring prestressing would be desirable.

The advantage of the above described method and the respective apparatus of the present invention is that they can be used with all structures having a diameter from 1m up to 50m made of concrete, steel (also tire steel), wood etc. Even the present structures managing to burst can be prestressed by using this method and restored in this way.

A bracing cable encircling the whole circumference is not anchored with both ends at different places, but at one place only. This is economically advantageous whereby the statics of the container remain the same.

The anchorage of the cable ends does not project out from the profile of the wall thickness to the outside or inside, it will remain inside the profile which represents savings on concrete cubic contents and reinforcement steels, and a simplification of the concrete casing.

The anchorage body is located in the recess of the wall in overhung position, that means that it is not lying on the concrete or another material. The recess is poured out with a pure concrete which is acting as a rust-preventing material.

The bracing cable prestressed by the above described means can be compared with a leather belt. It encircles the whole circumference, it is 360°, and is anchored in itself by means of a "lock". When however, the encircling of 360° is not advantageous or admissible, the cable circle can be divided in two or more parts with the respective anchorages.

What I claim is:

1. In combination, an anchorage device for use in anchoring at least one ring tensioning member in the thickness of a circular container wall, especially a wall of concrete tank or tube, comprising:

a one-piece hemispherical body defined by a flat front surface and round side and rear surfaces interconnecting opposite side edges of said front surface, a flat support surface disposed in a plane perpendicular to said flat front and extending between said front and rear surfaces, and an upper surface, the longitudinal extent of said device being defined by said flat front surface and said round rear surface;

at least one slot being formed on the circumference of said round side and rear surfaces for receiving one or more loops of said at least one ring tensioning member said slot being disposed within a plane disposed centrally between said support and upper surface and parallel to said support surface;

at least two through bores being formed in said body and extending perpendicularly from said flat front surface through the body and exiting from said round rear surface in a plane disposed immediately adjacent the plane defined by said slot, a conical recess being formed in each of said bores at the flat front surface end thereof, said bores being designed to receive the free ends of said at least one ring tensioning member; and said at least one ring tensioning member having loop portions thereof disposed within said slot along said round side and rear surfaces and having the free ends thereof secured in said bores, whereby said loops and said free ends of said tensioning member are substantially coplanar as a result of the immediately adjacent dispositions of said slot and bores.

2. An anchorage body according to claim 1, in combination with at least a pair of conically shaped clamps for receiving said free ends of said ring tensioning member and being designed to be locked within said conical recesses of said bores.

3. An anchorage body according to claim 1, wherein said body is made of metal.

4. An apparatus for use in anchoring a ring tensioning member in the form of a bracing cable in the thickness of a circular container wall, especially the wall of a concrete tank or tube, which comprises:

a one piece hemispherical body defined by a flat front surface and round side and rear surfaces interconnecting opposite side edges of said front surface, a flat support surface disposed in a plane perpendicular to said flat front and extending between said front and rear surfaces, and an upper surface, the longitudinal extent of said device being defined by said flat front surface and said round rear surface;

at least one slot being formed on the circumference of said round side and rear surfaces for receiving one or more loops of said at least one ring tensioning member, said slot being disposed within a plane disposed centrally between said support and upper surface and parallel to said support surface;

at least two through bores being formed in said body extending perpendicularly from the flat front surface through the body and exiting from the round rear surface outside the plane defined by said slot, said bores being designed to receive the free ends of said at least one ring tensioning member;

conically-shaped clamps for anchoring the ends of said at least one ring tensioning member in said through bores on the flat front surface end of said body;

said at least one ring tensioning member having loop portions thereof disposed within said slot along said round side and rear surfaces and having the free ends thereof secured in said bores, whereby said loops and said free ends of said tensioning member are substantially co-planar as a result of the immediately adjacent dispositions of said slot and bores;

means for deviating the free ends of said ring tensioning cable from the direction defined by said through bores; and means for pre-stressing said ring tensioning member by stretching the deviated free ends of said ring tensioning cable.

* * * * *

UNITED STATES PATENT AND TRADEMARK OFFICE
CERTIFICATE OF CORRECTION

PATENT NO. : 4,079,486
DATED : March 21, 1978
INVENTOR(S) : Hans Dietrich

It is certified that error appears in the above-identified patent and that said Letters Patent are hereby corrected as shown below:

Please insert the following:

--[30] Foreign Application Priority Data

Nov. 22, 1972 Switzerland.............017032/72--

Signed and Sealed this

Seventh Day of November 1978

[SEAL]

Attest:

RUTH C. MASON
Attesting Officer

DONALD W. BANNER
Commissioner of Patents and Trademarks